Aug. 9, 1949.   K. E. YUNGEL   2,478,801
FISHING PLUG
Filed Sept. 3, 1947
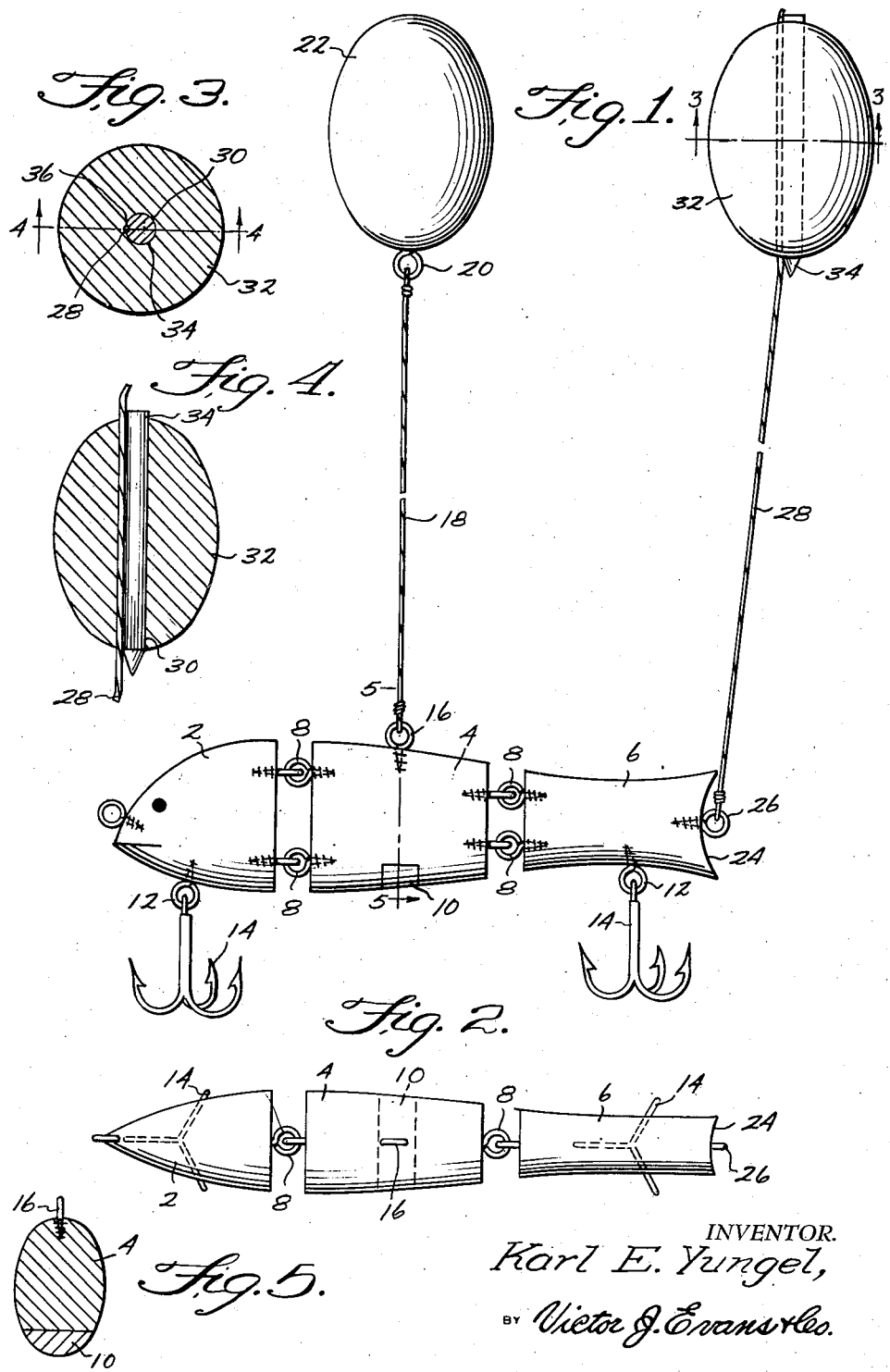
INVENTOR.
Karl E. Yungel,
BY Victor J. Evans & Co.
ATTORNEYS Patented Aug. 9, 1949

2,478,801

UNITED STATES PATENT OFFICE 2,478,801

FISHING PLUG

Karl E. Yungel, Belleair, Fla.

Application September 3, 1947, Serial No. 771,838

7 Claims. (Cl. 43—42.15)

My present invention relates to an improved fishing plug of the pivotally jointed sectional type weighted to submerge the plug and supported centrally from a bobber of fixed height and rearwardly from the fishing line adjustably attached to a second bobber.

The plug of my invention is so constructed that when the line is pulled the plug will wigggle rearwardly and when the line is loosened the plug will wiggle forwardly and these motions will attract fish to the plug and its baited hooks.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a side elevational view of the plug of my invention shown supported by the bobbers.

Fig. 2 is a top plan view of the plug.

Fig. 3 is a sectional view at line 3—3 of Fig. 1.

Fig. 4 is a sectional view at line 4—4 of Fig. 3.

Fig. 5 is a sectional view at line 5—5 of Fig. 1.

Referring now to the drawings wherein I have illustrated the present preferred embodiment of the plug of my invention, I employ the sections 2, 4 and 6 connected by screw eyes 8 to form a simulated fish. A weight 10 is attached to the central section 4 to insure submergence of the plug, and sections 2 and 6 have screw eyes 12 for hooks 14.

At the approximate central balance point of the central section 4 I locate a screw eye 16 for line 18 depending from the eye 20 of bobber 22 which floats on the surface of the water.

On the rear concave face 24 of the rear section 6 I use an eye 26 for the fishing line 28 which passes through the central bore 30 of bobber 32 and is adjustably secured by pin 34 having a longitudinal groove 36, the line 28 extending to the fishing pole not shown.

As shown, the plug is suspended from the bobbers, and when the fishing line 28 is pulled the plug will swing on the line 18 and due to its construction the sections will oscillate simulating a wiggling motion. When the fishing line is released, the plug will swing back and will wiggle in its return. Alternate pulling and releasing on the fishing line will obviously move the plug back and forth continuously gyrating.

Having thus fully described my invention what I claim as new and desire to secure by Letters Patent is:

1. A fishing plug comprising articulated sections and hooks on certain of said sections, a supporting line secured to the central point of one of said sections and a bobber for the line, a fishing line secured to another of said sections, and a bobber on the fishing line.

2. A fishing plug comprising articulated sections and hooks on certain of said sections, a supporting line secured to the central point of one of said sections and a bobber for the line, a fishing line secured to another of said sections, and a bobber adjustably secured on the fishing line.

3. A fishing plug comprising articulated sections and hooks on certain of said sections, a supporting line secured to the central point of one of said sections and a bobber for the line, a fishing line secured to the rear face of another of said sections, and a bobber on the fishing line.

4. A fishing plug comprising articulated sections and hooks on certain of said sections, a supporting line secured to the central point of one of said sections and a bobber for the line, a fishing line secured to the rear face of another of said sections, and a bobber adjustably secured on the fishing line.

5. A fishing plug comprising articulated sections and hooks on certain of said sections, a supporting line secured to the central point of one of said sections, a weight in the latter section and a bobber for the line, a fishing line secured to another of said sections, and a bobber on the fishing line.

6. A fishing plug comprising articulated sections and hooks on certain of said sections, a supporting line secured to the central point of one of said sections, a weight in the latter section aligned with the supporting line and a bobber for the line, a fishing line secured to another of said sections, and a bobber on the fishing line.

7. A fishing plug comprising articulated sections and hooks on certain of said sections, a supporting line secured to the central point of one of said sections, a weight in the under side of the latter section aligned with the supporting line, and a bobber for the line, a fishing line secured to another of said sections, and a bobber on the fishing line.

KARL E. YUNGEL.

REFERENCES CITED

The following references are of record in the file of this patent:

UNITED STATES PATENTS

| Number | Name | Date |
|---|---|---|
| 1,512,656 | Ward | Oct. 21, 1924 |
| 1,549,881 | Johnson | Aug. 18, 1925 |
| 2,069,972 | Schroeder | Feb. 9, 1937 |